US006349181B1

(12) United States Patent
Truc

(10) Patent No.: US 6,349,181 B1
(45) **Date of Patent: *Feb. 19, 2002**

(54) SLEEVING METHOD FOR PHOTOGRAPHIC NEGATIVES

(75) Inventor: James A. Truc, Eden Prairie, MN (US)

(73) Assignee: Eastman Kodak Company, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/483,007

(22) Filed: Jan. 13, 2000

Related U.S. Application Data

(62) Division of application No. 09/295,203, filed on Apr. 20, 1999, now Pat. No. 6,105,775.

(51) Int. Cl.[7] .......................... G03B 27/62; B65D 85/48

(52) U.S. Cl. .......................... 396/661; 355/75; 206/455

(58) Field of Search ................................ 396/429, 661; 355/40, 75; 206/455, 425, 232; 40/359

(56) References Cited

U.S. PATENT DOCUMENTS

| | | | | | |
|---|---|---|---|---|---|
| 2,188,813 | A | | 1/1940 | King | 229/68 |
| 4,095,694 | A | | 6/1978 | Jost | 206/455 |
| 4,771,343 | A | | 9/1988 | Takenaka | 358/335 |
| 4,966,285 | A | | 10/1990 | Otake et al. | 206/455 |
| 4,979,032 | A | | 12/1990 | Alessi et al. | 358/76 |
| 5,000,319 | A | | 3/1991 | Mermelstein | 206/455 |
| 5,031,773 | A | | 7/1991 | Manico et al. | 206/455 |
| 5,049,984 | A | | 9/1991 | Moore, Jr. et al. | 358/54 |
| 5,092,466 | A | | 3/1992 | Anderson | 206/438 |
| 5,157,482 | A | | 10/1992 | Cosgrove | 358/54 |
| 5,179,409 | A | | 1/1993 | Kazami et al. | 355/75 |
| 5,259,504 | A | | 11/1993 | Manico | 206/455 |
| 5,400,152 | A | | 3/1995 | Manico et al. | 358/501 |
| 5,423,425 | A | | 6/1995 | Stompe | 206/449 |
| 5,431,449 | A | | 7/1995 | Arimoto et al. | 281/31 |
| 5,436,694 | A | | 7/1995 | Ishikawa et al. | 355/75 |
| 5,546,155 | A | * | 8/1996 | Yamamoto | 396/661 |
| 5,749,468 | A | | 5/1998 | Manico et al. | 206/455 |
| 5,801,852 | A | | 9/1998 | Truc et al. | 358/502 |
| 5,940,168 | A | * | 8/1999 | Ishii | 355/40 |
| 6,105,775 | A | * | 8/2000 | Truc | 206/455 |
| 6,227,368 | B1 | * | 5/2001 | Truc | 206/455 |
| 6,270,932 | B2 | * | 8/2001 | Tatsumi et al. | 206/455 |

FOREIGN PATENT DOCUMENTS

EP 0 550 932 A1 12/1992

* cited by examiner

*Primary Examiner*—Christopher E. Mahoney
(74) *Attorney, Agent, or Firm*—Kinney & Lange, P.A.

(57) ABSTRACT

A storage system for storing photographic film negatives that makes it easier for a consumer to identify the images on each negative. The storage system is made from sleeving material having several individual sleeves for storing strips of photographic film negatives. An index print is affixed to the sleeving material so that the positive images on the index print are located directly above the sleeve holding the negative on which the positive images are based.

7 Claims, 3 Drawing Sheets

SLEEVING METHOD FOR PHOTOGRAPHIC NEGATIVES

CROSS-REFERENCE TO RELATED APPLICATION(S)

The present application is a divisional of U.S. Patent application entitled Sleeving System for Photographic Negatives, Ser. No. 09/295,203, filed on Apr. 20, 1999 now U.S. Pat. No. 6,105,775.

BACKGROUND OF THE INVENTION

The following invention relates to the storage of photographic film negatives, and in particular, to a storage system for storing photographic film negatives in which positive images are used to identify the subject matter of the stored photographic film negatives.

After a roll of photographic film has been developed and the photographs printed, the photographic film negatives are usually cut into short strips and placed into sleeves to protect the negatives from damage. The sleeves are typically made from a transparent, thin plastic that can be easily folded, with each sleeve comprising an elongated rectangular pouch. Several standard machines are used by film processors to load the photographic film into sleeving material and to cut the film negatives to the correct length. When using such standard machines, the sleeving material comes off a large plastic roll and once the entire film has been cut and each negative strip has been inserted into a sleeve, that length of sleeving material is detached from the roll. The sleeved negatives are then folded, placed in a package containing the printed photographs, and are given to the customer along with the printed photographs.

A problem with the use of such a film negative storage system is that it is difficult to determine which printed photograph is represented in each negative. When it is desired to make a duplicate of a photograph, many negatives must be taken out of the sleeves in which they are stored and held up to the light to be scrutinized before it can be determined which negative represents the desired photograph When handled in such a manner, fingerprints are often deposited on the negatives and the negatives can become scratched or otherwise damaged, resulting in poor quality reprints or enlargements.

In addition, when more than one set of photographic negatives is stored in one place, such as a box or drawer, the sleeves containing each set of negatives often get separated from the printed photographs to which they correspond. This makes it even more difficult to find the negative that corresponds to a particular photograph.

To aid a consumer in organizing the negatives and the corresponding printed photographs, index prints have been developed. Index prints contain positive images of each photographic image that appears on the film. The goal of index prints is to aid the consumer in identifying which photographs appear on a particular negative. Problems arise, however, because consumers often do not keep the index print with the negatives. Once the negatives become separated from the index print, the same problems develop regarding being unable to determine which photograph was created from which negative.

Index prints may be created by scanning a photographic film and collecting each image from the film so that it can be exposed onto photosensitive paper, much like the way each individual photograph is made. Index prints may also be printed on some type of non-photosensitive material, most often paper or plastic. These index prints are created by scanning a film and collecting digital image data, which can then be sent to a printer. Ink jet printers are commonly used because they offer the greatest flexibility of the type of material used when creating an index print. A draw back of ink jet printing is that it is much slower than other types of printing. However, using other printers, such as a laser printer, may reduce the options available for the type of paper or plastic used in creating the index print.

Index prints have been created that also form a storage system for the film negatives, making it easier to find the negative that corresponds to a particular photographic print. One such negative storage system is disclosed in U.S. patent Ser. No. 5,801,852, Positive Sleeving System for Photographic Negatives, filed on Jun. 7, 1995 and assigned to Pakon, Inc.

A continuing need exists in the art for index prints printed on faster and more efficient printers. In addition, flexibility in the type of material used to create the index print is desired. If the index prints can be attached or affixed to a storage system for the photographic film negatives in such a way that the positive image on the index print corresponds to the images on the film negative, such a film storage system would be a significant improvement in the art.

BRIEF SUMMARY OF THE INVENTION

The present invention answers a need in art for a storage system for making photographic film negatives easily identifiable. The present invention is a storage medium for photographic film negatives with an index print adhesively attached to the sleeving material in which is stored strips of photographic film negatives.

Photographic film negatives can be loaded into sleeving material using standard methods and practices well known in the art. In addition, the sleeving material may be any standard sleeving material that is currently widely available. The inventive storage medium further comprises an index print which is affixed to the sleeving material. The index print contains a positive image of each photographic image on the strip of photographic film negative. The positive images are roughly the same size as the corresponding negative image on the negative strip. Once the index print is attached to the sleeving material, the location of the positive images on the index print corresponds directly to the location of the images on the photographic film negative. Thus, the positive images corresponding to a strip of photographic film negative are located directly over the sleeve containing the corresponding negative strip.

The inventive storage medium is assembled by loading photographic film into sleeving material using current practices. Once the film negatives are loaded into the sleeving material, the index print is adhered to the sleeving material. The adherence may take place by having a layer of adhesive on the index print which allows the index print to be coupled with the sleeving material. Another option is to use an adhesive layer on the sleeving material. Once the adhesive on the sleeving material is activated, the sleeving material is coupled to the index print.

DETAILED DESCRIPTION

Figure 1A:
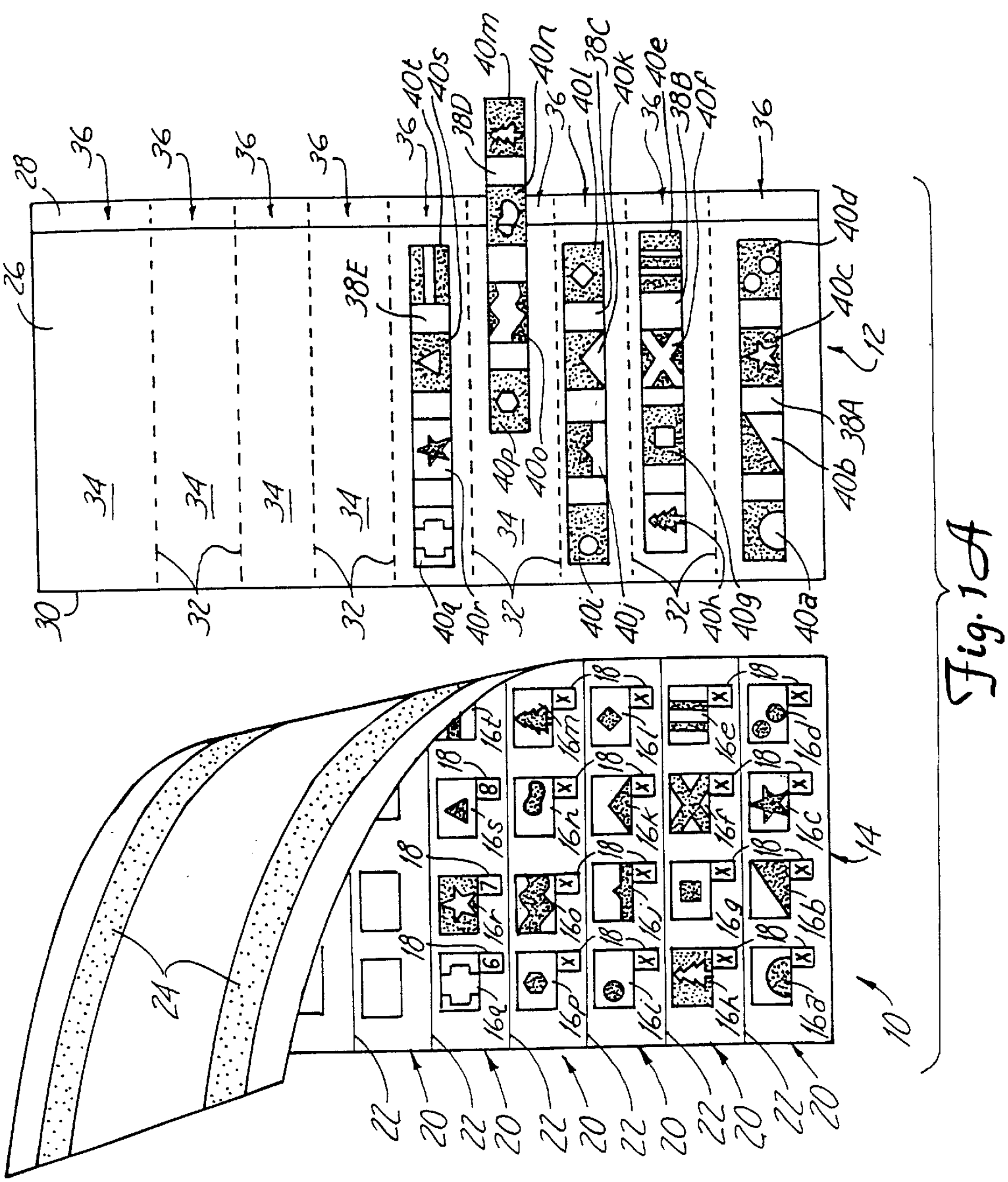
FIG. 1A is a diagrammatic view of an index print and sleeving material.

FIG. 1A is a diagrammatic view of an index print 10 and sleeving material 12. The index print 10 comprises a sheet of paper 14 upon which several positive images appear 16A–16S. Each positive image 16A–16S has an associated identifying number 18. The images 16A–16S are in rows 20 of four images across, and each row 20 is separated by a score line 22. The paper 14 is partially folded to reveal the back side of the paper which has adhesive strips 24. The adhesive strips 24 run from the top of the paper 14 to the bottom of the paper 14.

The sleeving material 12 comprises a top piece 26 and bottom piece 28 created by folding the sleeving material 12 along fold 30. The sleeving material 12 also comprises several seams 32 which divide the sleeving material 12 into several individual sleeves 34. In addition to creating the sleeves 34, the seams 32 may include a perforated seam 32 to allow one sleeve 34 to be separated from an adjoining sleeve 34. Each sleeve 34 has a corresponding aperture 36 that allows a piece of material, most commonly a film negative strip 38A–38E, to be inserted into the sleeve 34. In FIG. 1A, the top four sleeves 34 are empty, while the bottom five sleeves 34 contain negative strips 38A–38E. A negative strip 38D is partially removed from its sleeve 34 to illustrate how the sleeves 34 can be used to store and protect the strips of negatives 38A–38E.

Each strip of negatives 38A–38E comprise individual negative images 40A–40T used to create a photographic print. In addition, the negatives 38A–38E are used to make the index print 10. More specifically, each positive image 16A–16S on the index print 10 corresponds to a negative image 40A–40T on a negative strip 38A–38E.

Each row 20 of positive images 16A–16S on the index print 10 are arranged so that they correspond with the negative images 40A–40T of a negative 38A–38E stored in a sleeve 34. On the bottom row 20, the index print 10 has four positive images 16A–16D. Similarly, the negative strip 38A inserted into the bottom sleeve 34 has four negative images 40A–40D. The index print 10 can be affixed to the sleeving material 12 so that a row of positive images 16A–16D appears directly over the negative strip 38A on which the images 16A–16D are based. Once the index print 10 and the sleeving material 12 are assembled, the first positive image 16A on the left corner of the index print 10 corresponds to the negative image 40A in the left corner on the negative strip 38A. In the same manner, the second positive image 16B on the index print 10 corresponds to the second negative image 40B on the negative strip 38A, the third positive image 16C corresponds to the third negative image 40C on the negative strip 38A, and the fourth positive image 16D corresponds to the fourth negative image 40D on the negative strip 38A. This same configuration is used for each row 20 of positive images 16A–16S on the index print 10 and the corresponding negative strips 38A–38E stored in a sleeve 34 directly under the row 20 of positive images 16A–16S.

Figure 1B:
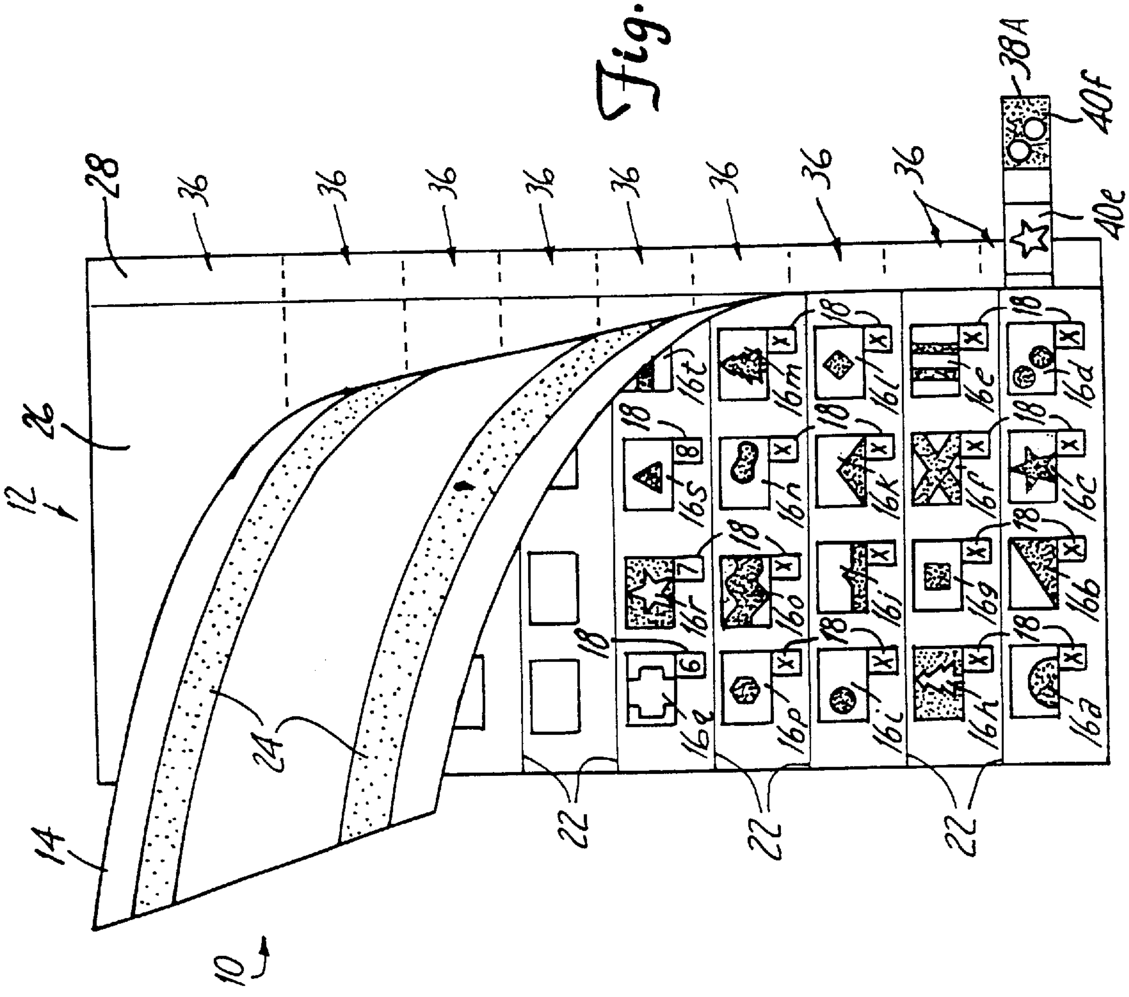
FIG. 1B is a diagrammatic view of an index print partially attached to sleeving material.

The adhesive strips 24 allow the index print 10 to be affixed to the sleeving material 12 to create a positive sleeving system. FIG. 1B is an illustration of the index print 10 partially attached to sleeving material 12. In attaching the index print 10 to the sleeving material 12, the adhesive strips 24 are used to affix the paper 14 to the top sheet 20 of the sleeving material 12. Once so affixed, the index print 10 provides an illustration of the contents of each photographic film negative strip 38A–38E stored in the sleeving material 12 while still allowing each negative strip 38A–38E to be removed from and replaced in the sleeve 34.

As explained above, each positive image 16A–16S is located directly above the photographic negative image 40A–40T located on the negative strip 38A–38E. In addition, each positive image 16A–16S is roughly the same size as the photographic negative image 40A–40T. This configuration greatly aids a user in finding the correct negative 38A–38E when the negative 38A–38E is desired for making reprints or enlargements. Because the index print 10 is correlated to the negative 38A–38E over which it appears, a user need only find the image 16A–16S on the index print 10 they wish to duplicate, and remove the negative film strip 38A–38E from the sleeve 32 behind that row on the index print 10. To further aid a consumer in identifying a positive image 16A–16S and match it to a negative image 40A–40T, each positive image 16A–16S on the index print 10 has an associated identifying number 18. Also shown in FIG. 1B are score marks 22. The paper 14 is scored along score lines 22 so that the paper 14 and sleeving material 12 can be easily folded.

An advantage of the present embodiment is that the sleeving material 12 does not need to be specially manufactured to create the sleeving system. Such a sleeving material 12 is well known to those skilled in the art and is widely available. The purpose of the sleeving material 12 is to provide a protective storage place for film negatives 38A–38E once the film has been developed. Film developers use a machine to both insert the strip of negatives 38A–38E into the sleeving material 12 and simultaneously cut the strip of negatives 38A–38E to the desired length. Once inserted into the sleeving material 12, the negatives 38A–38E are protected from being scratched or otherwise suffering from conditions that would reduce their quality, such as fingerprinting or abrasives caused by handling the negative strips 38A–38E. In the United States, the conventional length to which the film negative is cut is a strip containing four images.

The sleeving material 12 is generally supplied on a roll containing several feet of the material 12. The material 12 is feed into a sleeving machine, as is a roll of developed film negatives. The machine inserts a length of film into a sleeve and cuts the film into strips the appropriate length. After each cut, the machine advances the sleeving material so that another sleeve is ready to accept another length of film. Once the end of the film is reached, and the last negative strip is inserted into sleeving material, that length of sleeving material can be separated from the roll. The sleeving material may likewise be scored so that is it easily foldable. The sleeving material, along with the inserted negatives, can then be dispensed to a consumer. This method is well known to those skilled in the art and is a quick and efficient way to insert film into storage sleeves.

The index print 10 may be created using a variety of methods. One such method is to use a scanner to scan the negatives 38A–38E. When using a scanner, the photographic film negative images 40A–40T are projected onto a linear scanner. The scanner scans each image 40A–40T and collects an electronic representation of the images. One such scanner that is suitable is the Pakon Film Scanner described in U.S. patent application Ser. No. 08/604,330, filed on Feb. 2, 1996. Once collected, this electronic image is converted into digital image data which can be formatted to make the image suitable for printing. Formatting may consist of sizing, sharpening, or otherwise manipulating the digital image data to prepare it for printing. In the present invention, the digital image data is formatted so that the number of positive images 16A–16D printed on a row corresponds with the number of negative images 40A–40T on each negative strip 38A–38E. In the United States, negatives are usually cut so that four images appear on each strip. Thus, the index print 10 can be formatted so that four positive images 16A–16D appear per row. Once formatted, the digital image data can be sent to a printer and the index print 10 can be printed.

Figure 2:
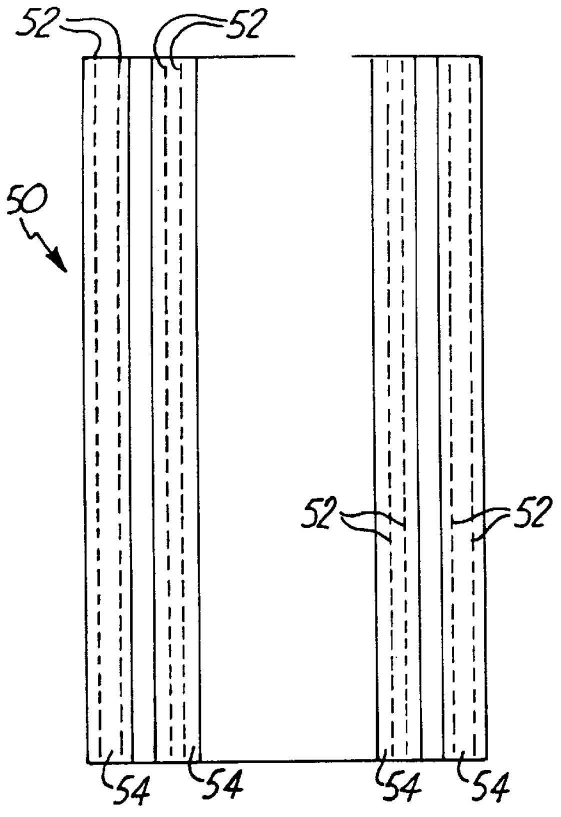
FIG. 2 is a top plan view of the back of an index print.

FIG. 2 is a top plan view of the back of an index print 50. On the back of the index print 50 are strips of adhesive 52. The strips of adhesive 52 are covered by releasable backing strips 54. To attach the index print 50 to sleeving material, the backing strips 54 must be removed to expose the adhesive strips 52 underneath. Once the adhesive 52 is exposed, the index print 50 can be affixed to a length of sleeving material. A major benefit of the configuration shown in FIG. 2 is that currently available sleeving material can be affixed to the index print 50 to create the sleeving system. Because any of the widely available types of sleeving material can be used in the sleeving system, there is no need for a film processor to acquire new equipment because their present sleeving and film negative cutting machines are capable of implementing the present invention.

Figure 3:
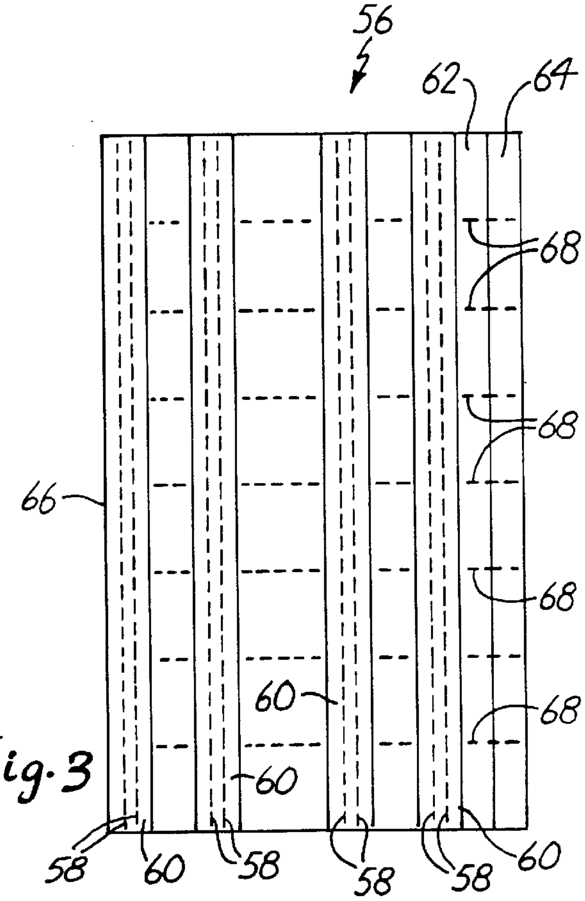
FIG. 3 is a top plan view of the front of a length of sleeving material.
Figure 4:
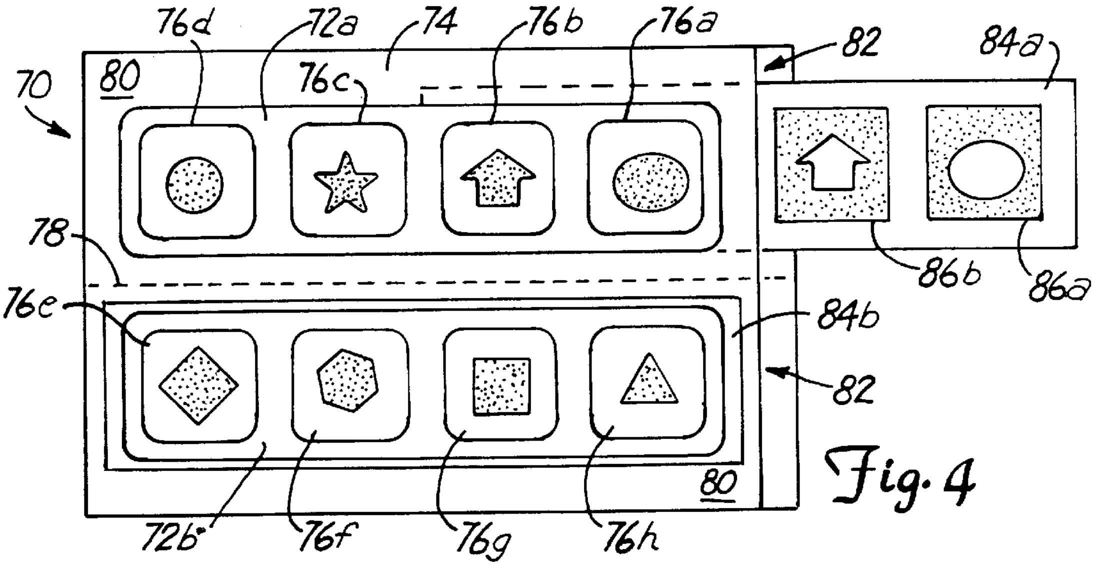
FIG. 4 is a diagrammatic view of an index print sticker attached to conventional sleeving material.

FIG. 3 shows an alternate embodiment of the present invention. FIG. 3 is a top plan view of sleeving material 56 with adhesive strips 58 and backing strips 60. The sleeving material 56 comprises a front layer 62 and a back layer 64 folded along a fold 66 and joined at several seams 68 to create several individual sleeves 70. Each sleeve 70 can receive a strip of photographic film negative. The adhesive strips 58 are located on the front layer 62 of the sleeving material 56. In this embodiment, the adhesive layer 58 is attached to the sleeving material 56 rather than the index print. This embodiment is particularly useful because the material on which the index print is printed does not have an adhesive coating, and as such can be any variety of material, either paper, plastic, or some other suitable medium. In addition, any variety of printing methods can be used to print the index print based on the type of paper, plastic, or other medium used.

In the past, sleeving systems were limited to being printed on the much slower ink jet printers because special paper was used in making the index print. The film negatives were stored in direct contact with the index print, so the paper was often coated with a plastic layer. When coated with a plastic layer, it was not possible to use the paper in a laser printer because the plastic layer would damage the printer or melt. In addition, the paper was not suitable for use in certain chemical processes because the plastic layer would be adversely affected. By placing the adhesive on the sleeving material rather than the index print, concerns regarding the type of paper used are significantly lessened. For the same reasons, the paper can be printed using any variety of printing methods, including ink jet printing, laser printing, dye sublimation printing, and other similar methods. It is particulary beneficial to print the index print using a laser printer. The laser print quality is extremely high, and laser printers are significantly faster than ink jet printers.

The adhesive layer 58 can be comprised of any suitable adhesive. Most preferably, the adhesive layer 58 is comprised of a pressure sensitive adhesive covered by a removable backing strip 60. There are a variety of suitable adhesives available that are well known to those skilled in the art. Though discussed in terms of strips running the length of the index print, other placements of the adhesive layer are possible, such as a strip down middle, several parallel horizontal strips to correspond with the sleeves, or any other suitable configurations.

FIG. 5 is another embodiment of the present invention. FIG. 5 is a diagrammatic view of a portion of a storage system 70 using index print stickers 72A–72B and sleeving material 74. Index print stickers 72A–72B are affixed to the sleeving material 74 and comprise several positive images 76A–76H. The sleeving material comprises a seam 78 which creates two sleeves 80. Each sleeve 80 has a corresponding aperture 82. The sleeves 80 each hold a negative 84A–84B, and each negative 84A–84B comprises several negative images 86A–86B. In FIG. 5, one negative 84A is partially removed from its storage sleeve 80.

The size of the index print sticker 72A–72B is roughly the same size as the negative 84A–84B from which it is created. Likewise, the positive images 76A–76H are roughly the same size as the negative images 86A–86B. The index print stickers 72A–72B are created using the film negatives 84A–84B. This may be done using a scanner to scan the film and collect digital image data, which is then sent to a computer. The computer may process the digital image data, and can also send the data to a printer. Most often, the index print stickers 72A–72B are printed using an ink jet printer. Each index print sticker 72A–72B has an adhesive layer on its back, allowing the index print sticker 72A–72B to be affixed to a sleeve 80 on the sleeving material 74.

To create the storage system 70, a length of film negative 82A–82B is inserted into each sleeve 78. Once the film is inserted, a corresponding index print sticker 72A–72B is affixed to the sleeve 78. The positive images 84A–84H on the index print stickers 72A–72B correspond with the negative images 86A–86B on the negatives 82A–82B stored directly underneath the sticker 72A–72B. More specifically, as can be seen from the partially removed negative 82A, the positive images 84A, 84B on the index print sticker 72A correspond to the images 86A, 86B on the negative 82A stored in that particular sleeve 78. Thus, each negative 82A–82B is stored in the sleeve 78 on which the corresponding index print sticker 72A–72B is attached.

Though discussed in terms of being four images across to correspond to a negative strip containing four images, the present invention is not limited to such a configuration. In Europe, negatives are cut so that five images appear on each strip, and in Japan, negative strips are generally cut so that they are six images long. Depending on consumer demand, the index print may be formatted to be either four, five, or six images per row. In addition, the index print may be formatted so that it corresponds in size to the sleeving material with which it is used.

Although the present invention has been described with reference to preferred embodiments, workers skilled in the art will recognize that changes may be made in form and detail without departing from the spirit and scope of the invention.

What is claimed is:

1. A method for creating a storage system for identifying photographic film negatives, the method comprising:

creating an index print from a photographic film, the index print comprising positive images corresponding to those images on the film arranged in a plurality of rows, each row being spaced from an adjacent row, and each positive image in each row being spaced from an adjacent positive image;

printing the index print;

inserting a photographic film negative into sleeving material comprising a plurality of sleeves;

cutting the photographic film negative into strips that correspond to the size of the sleeves; and affixing the index print to the sleeving material so that each row of positive image on the index print appears directly in front of the sleeve holding the photographic film negative strip on which the row of positive images is based.

2. The method of claim 1 wherein the index print is created by scanning the film to collect digital image data, processing the digital image data, and printing the digital image data.

3. The method of claim 1 wherein the positive images on the index print are roughly the same size as the images on the photographic film negative.

4. The method of claim 1 wherein the index print is affixed to the sleeving material with an adhesive.

5. A method for creating a storage system for identifying photographic film negatives, the method comprising:

creating an index print from a photographic film, the index print comprising a plurality of rows of positive images, each row being spaced form an adjacent row and each positive image in each row being spaced form an adjacent positive image, and wherein each row of positive images is based on a strip of photographic film negative;

printing the index print;

inserting a photographic film negative into sleeving material, the sleeving material comprising a front layer and a back layer joined together with a plurality of seams to define a plurality of parallel sleeves for receiving strips of photographic film negatives and a plurality of perforated seams at which one sleeve can be detached from an adjoining sleeve;

cutting the photographic film negative into strips that correspond to the size of the sleeves;

detaching a length of sleeving material at a perforated seam so that the number of sleeves having an inserted photographic film negative is equal to the number of rows of positive images on the index print; and affixing the index print to the sleeving material so that each row of positive images on the index print appears directly above the sleeve holding the strip of photographic film negative on which the row of positive images is based.

6. The method of claim 5 wherein the positive images on the index print are roughly the same size as the images on the photographic film negative.

7. The method of claim 5 wherein the index print is affixed to the sleeving material with an adhesive.

* * * * *